US012731490B2

(12) United States Patent
Tseng et al.

(10) Patent No.: US 12,731,490 B2
(45) Date of Patent: Sep. 8, 2026

(54) MULTI-VEHICLE SPATIALLY BALANCED COVERAGE SYSTEM AND METHOD

(71) Applicant: National Central University, Taoyuan City (TW)

(72) Inventors: Kuo-Shih Tseng, Taoyuan City (TW); Yan-Shuo Li, Taoyuan City (TW); Pao-Te Lin, Taoyuan City (TW)

(73) Assignee: National Central University, Taoyuan City (TW)

( * ) Notice: Subject to any disclaimer, the term of this patent is extended or adjusted under 35 U.S.C. 154(b) by 73 days.

(21) Appl. No.: 18/914,920

(22) Filed: Oct. 14, 2024

(65) Prior Publication Data

US 2026/0038371 A1 Feb. 5, 2026

(30) Foreign Application Priority Data

Aug. 2, 2024 (TW) ................................ 113129064

(51) Int. Cl.
*G08G 1/16* (2006.01)
*G06F 17/11* (2006.01)

(52) U.S. Cl.
CPC ............ *G08G 1/164* (2013.01); *G06F 17/11* (2013.01)

(58) Field of Classification Search
CPC ................................ G08G 1/164; G06F 17/11
USPC .......................................................... 701/117
See application file for complete search history.

(56) References Cited

U.S. PATENT DOCUMENTS 9,671,791 B1 * 6/2017 Paczan .................. G05D 1/104
11,804,038 B1 * 10/2023 Kahn ...................... G06F 18/24
12,341,595 B2 * 6/2025 Lambert ............ H04B 7/18504
2014/0114556 A1 * 4/2014 Pan ...................... G08G 1/0129 701/119
2017/0088261 A1 * 3/2017 Sequeira ............. G01S 13/0209
2017/0131727 A1 * 5/2017 Kurdi ................... G05D 1/0027
2019/0196467 A1 * 6/2019 Aldana Lopez ......... G08G 5/21
2021/0216069 A1 * 7/2021 Koubaa .................... G08G 5/56
2022/0319312 A1 * 10/2022 Mintz ................. G07B 15/063
2023/0337329 A1 * 10/2023 Kanitkar ............... H04W 16/18
2025/0218301 A1 * 7/2025 Kim ....................... G06V 20/17
2025/0238033 A1 * 7/2025 Qu ....................... G05D 1/2465
2025/0290769 A1 * 9/2025 Hourunranta ........... B60L 53/63

(Continued)

FOREIGN PATENT DOCUMENTS

CN 113853638 A 12/2021
CN 116090680 A 5/2023

*Primary Examiner* — Krishnan Ramesh

(74) *Attorney, Agent, or Firm* — Demian K. Jackson; Jackson IPG PLLC

(57) ABSTRACT

The present invention relates to a multi-vehicle spatially balanced coverage system. The system includes a first mobile vehicle including a first sensor unit configured to sense a first environmental information; a second mobile vehicle including a second sensor unit configured to sense a second environmental information; and a computing unit configured to receive the first environmental information and the second environmental information, input them into a balanced load function, and accordingly compute a first forward point of interest and a second forward point of interest, to command in real-time the first mobile vehicle to move from a first initial point of interest to the first forward point of interest and the second mobile vehicle to move from a second initial point of interest to the second forward point of interest.

9 Claims, 6 Drawing Sheets

(56) References Cited

U.S. PATENT DOCUMENTS

2025/0324280 A1* 10/2025 Strasser ............... G05D 1/6445
2025/0392388 A1* 12/2025 Das ...................... H04B 10/116

* cited by examiner

700 giving a plurality of points of interest in a multi-dimensional space, wherein a plurality of points of interest includes a first initial point of interest, a second initial point of interest, a first forward point of interest, and a second forward point of interest (step 701)

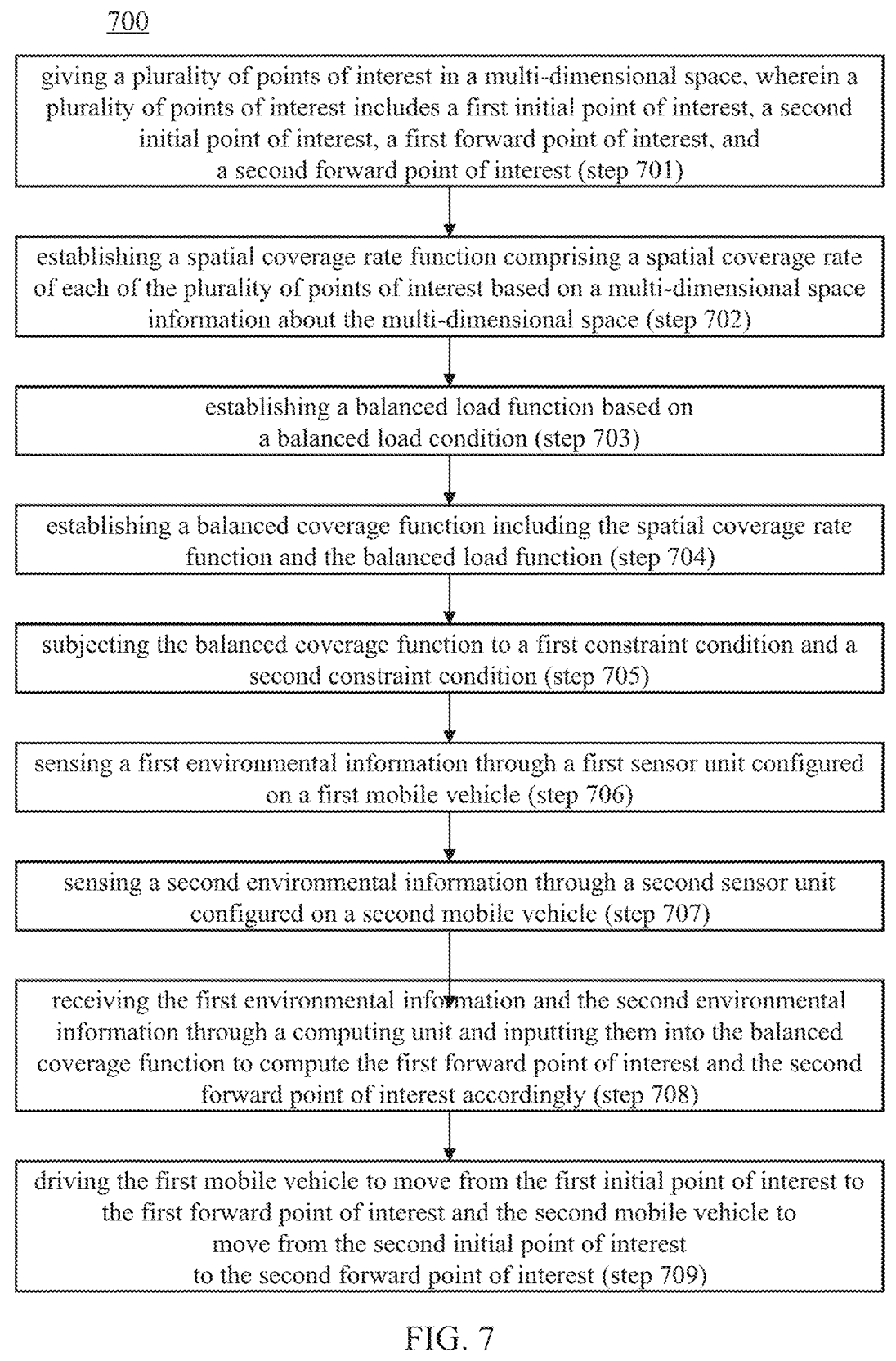

establishing a spatial coverage rate function comprising a spatial coverage rate of each of the plurality of points of interest based on a multi-dimensional space information about the multi-dimensional space (step 702)

establishing a balanced load function based on a balanced load condition (step 703)

establishing a balanced coverage function including the spatial coverage rate function and the balanced load function (step 704)

subjecting the balanced coverage function to a first constraint condition and a second constraint condition (step 705)

sensing a first environmental information through a first sensor unit configured on a first mobile vehicle (step 706)

sensing a second environmental information through a second sensor unit configured on a second mobile vehicle (step 707)

receiving the first environmental information and the second environmental information through a computing unit and inputting them into the balanced coverage function to compute the first forward point of interest and the second forward point of interest accordingly (step 708)

driving the first mobile vehicle to move from the first initial point of interest to the first forward point of interest and the second mobile vehicle to move from the second initial point of interest to the second forward point of interest (step 709)

FIG. 7

MULTI-VEHICLE SPATIALLY BALANCED COVERAGE SYSTEM AND METHOD

CROSS-REFERENCE TO RELATED APPLICATION

This application claims priority benefit to Taiwan Invention patent application Ser. No. 113129064, filed on Aug. 2, 2024, in Taiwan Intellectual Property Office, the entire disclosures of which are incorporated by reference herein.

FIELD

The present invention relates to a multi-vehicle spatially balanced coverage system and method, in particular, a multi-vehicle spatially balanced coverage system and method for planning the movement path of each of a plurality of mobile vehicles in such a way that the movement paths of the plurality of mobile vehicles do not intersect with each other, and for balancing both the workloads and the spatial coverage of each of the plurality of mobile vehicles, so as to achieve an overall coverage as large as possible.

BACKGROUND

Currently, conventional task allocation and balanced path planning algorithms are widely used in areas such as general network communication and ridesharing. For example, in existing network communication applications, communication between network nodes often uses a multi-rooted tree topology structure, which allows multiple root nodes, thereby providing a certain level of redundancy and flexibility to the network. However, the drawback of this multi-root tree structure is that it tends to complicate network management, which in turn affects the overall operational efficiency of the network.

In terms of load balancing mechanisms, current network communication systems rely primarily on continuously monitoring network bandwidth usage and setting pre-defined thresholds. When the detected network bandwidth usage falls below the threshold, the system automatically performs resource reallocation to balance the workload on the network. While this threshold-based method is simple and straightforward, it lacks flexibility and struggles to cope with complex and dynamic network environments. It can sometimes result in uneven resource allocation or slower system response.

On the other hand, in the ride-sharing domain, two main approaches are commonly used to solve the vehicle-passenger assignment problem: modelling the task assignment problem as a graph structure and using integer linear programming methods. Although these methods can effectively handle large-scale assignment problems, they oversimplify the complexity of real-world scenarios.

To address the aforementioned issues of task allocation and balancing, conventional technologies also propose a resource-constrained travel function minimisation problem, which aims to minimize the travel function under a resource usage cap. However, this approach has a significant limitation in that it does not consider the path length constraint. In practical applications, omitting the path length can lead to inappropriate or suboptimal assignment schemes, thereby affecting user experience and system efficiency.

In summary, there are several shortcomings of existing technologies in the area of network communication and ridesharing. These are mainly related to the flexibility of network topologies, the dynamic adaptability of load balancing mechanisms, the comprehensiveness of task assignment models, and the consideration of practical factors (such as path length) in balancing mechanisms. These limitations not only affect system efficiency and reliability, but also lead to inequitable resource allocation and reduced user experience.

Therefore, there is an urgent need for a new technical solution in the area of task allocation and balanced path planning to overcome the above shortcomings. The key requirements focus on providing a more flexible network topology structure, a more intelligent load balancing mechanism, a more comprehensive task allocation model, and a balancing mechanism that better adapts to real-world operational needs. Such improvements would significantly enhance the overall performance of network communication and car-sharing systems, thereby providing users with a superior service experience.

Hence, there is a need to solve the above deficiencies/issues.

SUMMARY

The present invention relates to a multi-vehicle spatially balanced coverage system and method, in particular, a multi-vehicle spatially balanced coverage system and method for planning the movement path of each of a plurality of mobile vehicles in such a way that the movement paths of the plurality of mobile vehicles do not intersect with each other, and for balancing both the workloads and the spatial coverage of each of the plurality of mobile vehicles, so as to achieve an overall coverage as large as possible.

The present invention provides a multi-vehicle spatially balanced coverage system. The system includes a first mobile vehicle including a first sensor unit configured to sense a first environmental information; a second mobile vehicle including a second sensor unit configured to sense a second environmental information; and a computing unit configured to receive the first environmental information and the second environmental information, input them into a balanced load function, and accordingly compute a first forward point of interest and a second forward point of interest, to command in real-time the first mobile vehicle to move from a first initial point of interest to the first forward point of interest and the second mobile vehicle to move from a second initial point of interest to the second forward point of interest.

The present invention further provides a multi-vehicle spatially balanced coverage method. The method includes sensing a first environmental information through a first sensor unit configured on a first mobile vehicle; sensing a second environmental information through a second sensor unit configured on a second mobile vehicle; receiving the first environmental information and the second environmental information through a computing unit and inputting them into a balanced coverage function to compute a first forward point of interest and a second forward point of interest accordingly; and driving the first mobile vehicle to move from a first initial point of interest to the first forward point of interest and the second mobile vehicle to move from a second initial point of interest to the second forward point of interest.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein:

FIG. 7 is a flow chart illustrating the implementation steps for the third embodiment of the multi-vehicle spatially balanced coverage method according to the present invention.

DETAILED DESCRIPTION

Figure 1:
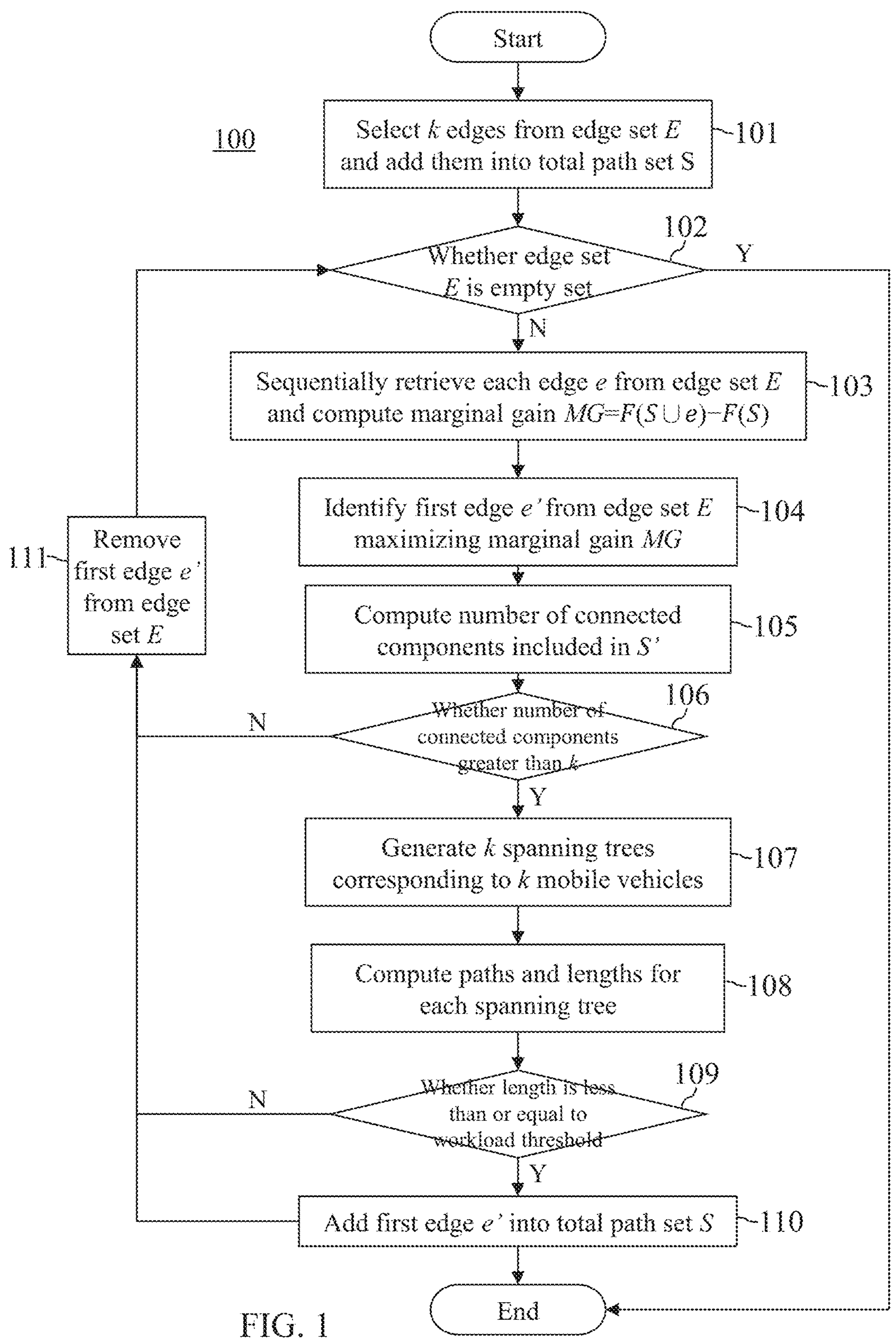
FIG. 1 is a flow chart illustrating the implementation steps for the first embodiment of the multi-vehicle spatially balanced coverage method according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

FIG. 1 is a flow chart illustrating the implementation steps for the first embodiment of the multi-vehicle spatially balanced coverage method according to the present invention. In this embodiment, the multi-vehicle spatially balanced coverage method according to the present invention that is applied in a two-dimensional space is demonstrated as an example for description. In this embodiment, the two-dimensional space is represented as a known planar map, although the application of the present multi-vehicle spatially balanced coverage method is not limited to two-dimensional spaces. FIG. 1 illustrates a flow chart for the application of the present method to perform a task of searching for specific objects on a known two-dimensional map.

Under the condition that the environmental map is known, the map contains multiple points of interest p and multiple edges e. The sets formed by these points of interest p and edges e forms a point set V and an edge set E, respectively, which the point set V and the edge set E together form a simplified weighted graph $\mathcal{G}$ based on the known environmental map.

Then, a spatial coverage rate function $f$ is pre-established for each point of interest p. The method for constructing the spatial coverage rate function $f$ includes, but is not limited to: densely partitioning a multi-dimensional space into multiple dense grids and then projecting each point of interest p onto the multi-dimensional space to calculate the number of grids it covers, thereby establishing the spatial coverage rate function $f$ corresponding to the known environmental map.

In one embodiment, the method involves densely partitioning a three-dimensional space into 3D virtual grids, and then estimating the number or proportion of 3D virtual grid spaces occupied by each point of interest p. After conversion, the coverage rate of a certain point of interest p can be acquired. The finer the grid in the three-dimensional space, the more accurate the estimated spatial coverage rate for each point of interest p will be. The grids are preferably established in forms including, but not limited to: uniform grids, non-uniform grids, triangular grids, polygonal grids, or random grids.

In this embodiment, it is preferable to project the three-dimensional space grids onto a two-dimensional space and compress them into two-dimensional space grids in order to improve the overall computational speed.

It is assumed that k mobile vehicles are deployed to perform a search task for specific objects based on the known environmental map, the total path set S comprehensively includes all possible movement paths for all the k mobile vehicles, wherein the initial state of the total path set S is set up as an empty set. The sub-path set S' is formed by collecting the multiple points of interest p planned for the respective mobile vehicles to arrive. Each mobile vehicle is equipped with multiple sensing units that detect environmental information, allowing the mobile vehicles to perform specific tasks based on the known environmental map.

It is assumed that the first constraint is to balance the workload and spatial coverage rate among the mobile vehicles, where the workload includes, but is not limited to, the movement path length of each mobile vehicle, namely, to keep the path lengths for the respective mobile vehicles as close to each other as possible to balance their respective workloads. The second constraint is that the number of movement paths generated must be greater than or equal to the number of mobile vehicles. The objective is to determine the optimal path planning that yields the maximum coverage rate for the k mobile vehicles under these two constraints, in order to arrange the vehicles to efficiently visit the points of interest p distributed on the known environmental map, to perform tasks such as, but not limited to: object search, map construction, or environmental monitoring.

As illustrated in FIG. 1, the multi-vehicle spatially balanced coverage method 100 according to the present invention includes the following implementation steps:

Step 101: Initially, select k edges out of from the edge set E and adding them into the total path set S.

Step 102: Determine whether the edge set E is an empty set or not. If the edge set E is empty, the execution of the multi-vehicle spatially balanced coverage method 100 is terminated.

Step 103: If the edge set E is not empty, sequentially retrieve each edge e out of from the edge set E and identify the points of interest p connected by both endpoints. Then, input these points into the spatial coverage rate function $f$ to compute the marginal gain MG=F(S∪e)−F(S).

Step 104: Identify the first edge e' out of from the edge set E, where the identified first edge e' maximizes the marginal gain MG.

Step 105: It is assumed that the sub-path set is S'. Let S'=S∪e' and compute the number of connected components included in S'.

Step 106: Determine whether the number of connected components in the sub-path set S' is greater than or equal to k. If the number is greater than or equal to k, proceed to Step 107. If it is less than k, proceed to Step 111.

Step 107: Generate k spanning trees corresponding to the movement paths of the k mobile vehicles in S'.

Step 108: Compute the paths and the lengths for each spanning tree in S'.

Step 109: Determine whether the length of the path of each spanning tree is less than or equal to the workload threshold, such as but not limited to a balanced length l. If the length of the path of each spanning tree is less than or equal to the balanced length l, proceed to Step 110. Otherwise, proceed to Step 111 to reselect an edge.

Step 110: Add the first edge e' into the total path set S.

Step 111: Remove the first edge e' from the edge set E.

When the procedure is complete, the multiple paths included in the total path set S represent the final path planning for the k mobile vehicles.

Figure 2A:
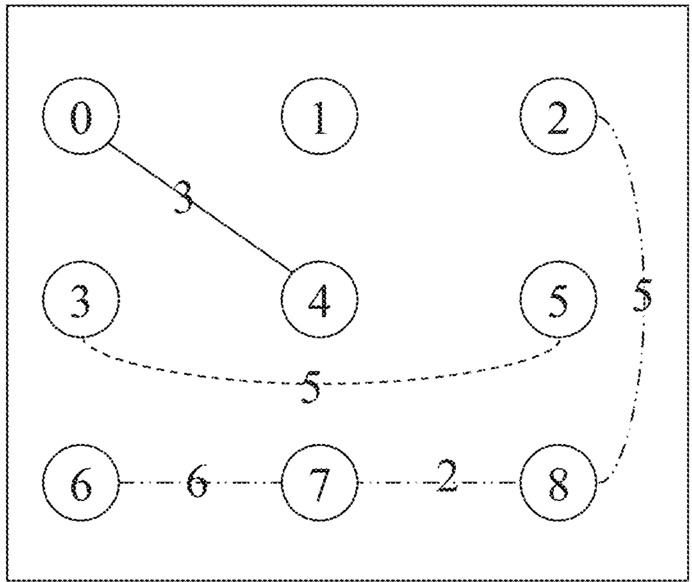
FIGS. 2(*a*) and 2(*b*) are schematic diagrams illustrating the first mode of the weighted graph included in the present invention.
Figure 2B:
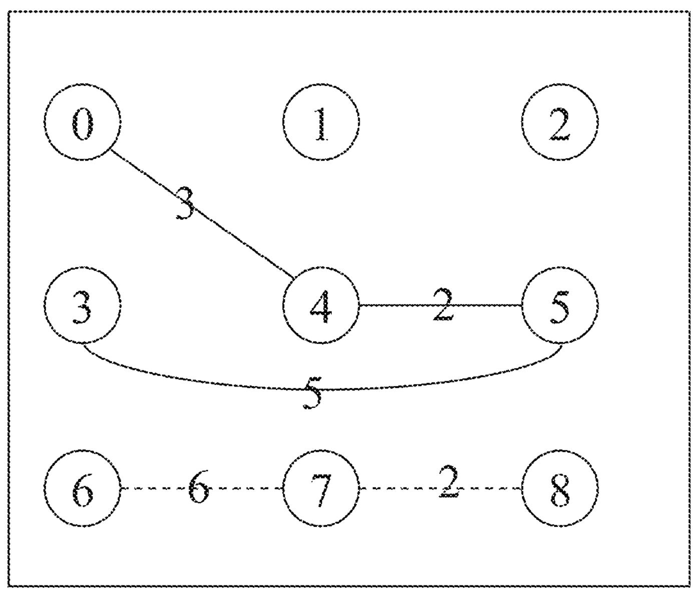

FIGS. 2(*a*) and 2(*b*) are schematic diagrams illustrating the first mode of the weighted graph included in the present invention. According to the aforementioned first constraint, the movement path for each mobile vehicle should not exceed the balanced length l. According to the aforementioned second constraint, the connected components, or the number of connected clusters, should be greater than or equal to k. Therefore, in this embodiment, the first constraint is considered as the path constraint $M^R$, while the second constraint is considered as the clustering constraint Mc.

FIGS. 2(*a*) and 2(*b*) demonstrate examples of how to determine whether a clustering condition is satisfied. In this embodiment, the weighted graph $\mathcal{G}$ shown in FIGS. 2(*a*) and 2(*b*) contains 9 nodes, namely, the nodes 0 to 8, which form the point set V. The connections between any two nodes form the edge set E. The nodes are divided into three connected components: the first connected component, the second connected component, and the third connected component.

In this embodiment, it is assumed that k=3, which means that there are three mobile vehicles. It is observed that FIG. 2(*a*) satisfies the clustering condition because the number of connected components is three, while FIG. 2(*b*) does not satisfy the clustering condition because the number of connected components is two, which is less than k.

In addition, in this embodiment, in FIG. 2(*a*), the movement path length of the first connected component is 3 units, the movement path length of the second connected component is 5 units, and the movement path length of the third connected component is 5+2+6=13 units. In FIG. 2(*b*), the movement path length of the first connected component is 3+2+5=10 units, and the movement path length of the second connected component is 2+6=8 units.

Figure 3A:
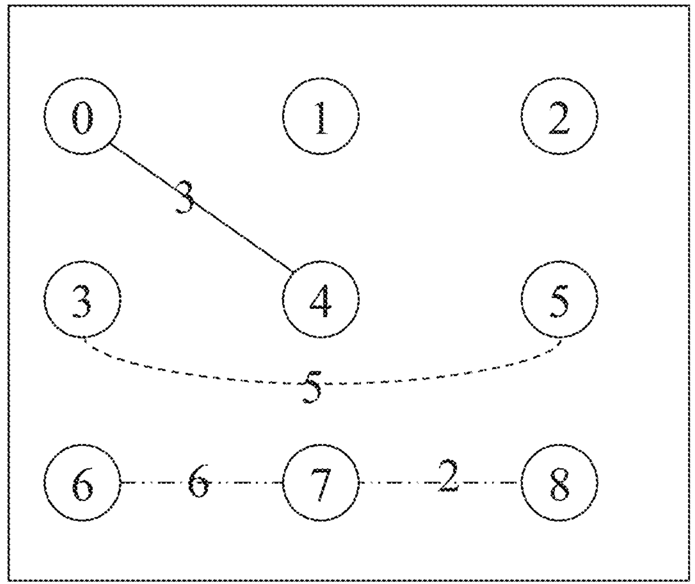
FIGS. 3(*a*) and 3(*b*) are schematic diagrams illustrating the second mode of the weighted graph included in the present invention.
Figure 3B:
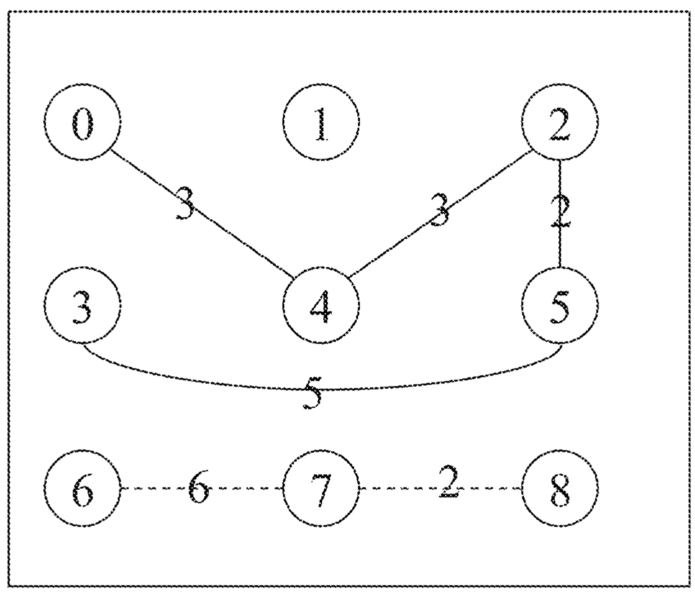

FIGS. 3(*a*) and 3(*b*) are schematic diagrams illustrating the second mode of the weighted graph included in the present invention. FIGS. 3(*a*) and 3(*b*) also demonstrate examples of how to determine whether a clustering condition is satisfied. In this embodiment, it is assumed that the balanced length l is 9, which means that the maximum movement path for each mobile vehicle is constrained to within 9 units.

In this embodiment, in FIG. 3(*a*), the movement path length of the first connected component is 3 units, the movement path length of the second connected component is 5 units, and the movement path length of the third connected component is 2+6=8 units. In FIG. 3(*b*), the movement path length of the first connected component is 3+3+2+5=13 units, and the movement path length of the second connected component is 2+6=8 units.

In this embodiment, because each path length in FIG. 3(*a*) is less than the balanced length l, namely, 9 units, it is determined that FIG. 3(*a*) satisfies the path condition. However, it is determined that FIG. 3(*b*) does not satisfy the path condition because the movement path length of the first connected component is 13 units, which exceeds the value of the balanced length l.

Figure 4:
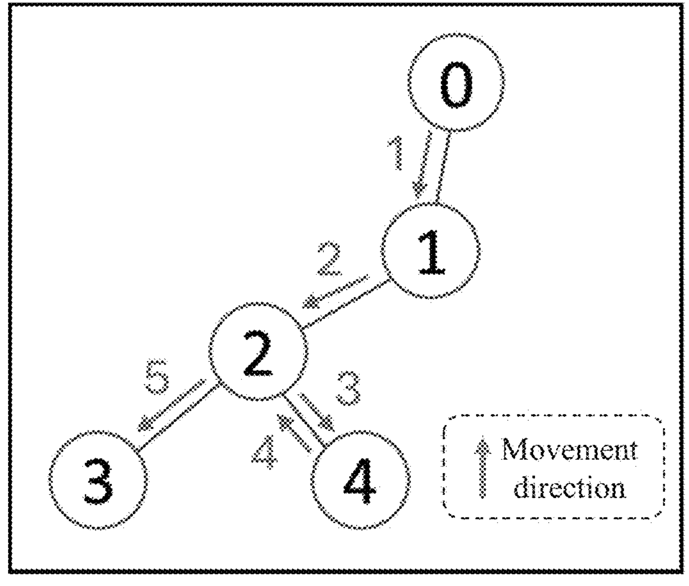
FIG. 4 is a schematic diagram illustrating the movement path for the spanning tree included in the present invention.

FIG. 4 is a schematic diagram illustrating the movement path for the spanning tree included in the present invention. The movement path for the spanning tree as shown in FIG. 4 represents the movement path of the mobile vehicle. It is assumed that the starting point of the mobile vehicle is node 0, the movement path follows the direction of the arrows and arrives all nodes in the order indicated by the numbers next to the arrows.

The movement path starts from node 0, moves to node 1, then from node 1 to node 2, from node 2 to node 4, back from node 4 to node 2, and finally from node 2 to node 3, forming a complete movement path.

Figures 5A, 5B, 5C:
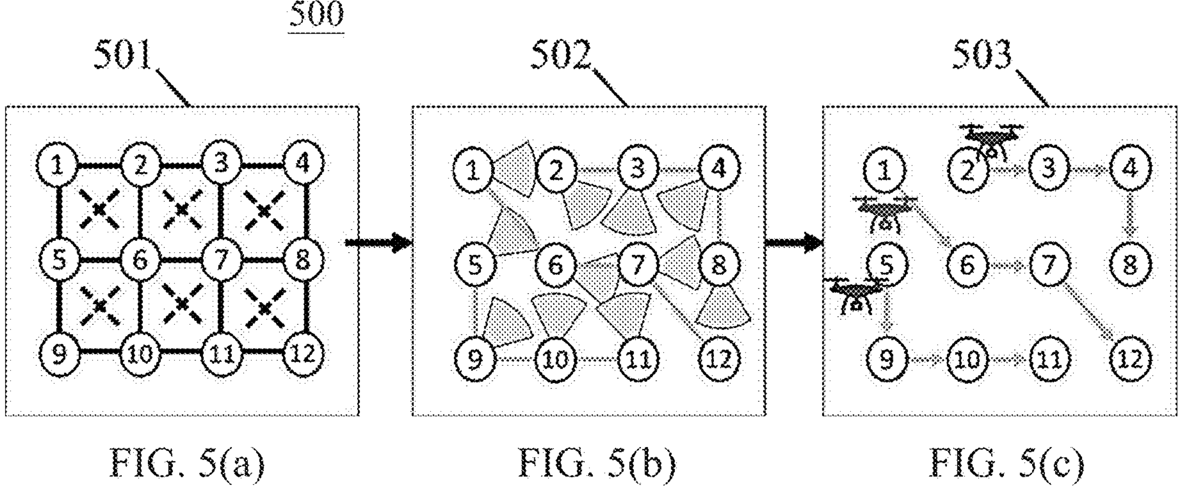
FIGS. 5(*a*) to 5(*c*) are schematic diagrams illustrating the second embodiment of the multi-vehicle spatially balanced coverage method according to the present invention.

FIGS. 5(*a*) to 5(*c*) are schematic diagrams illustrating the second embodiment of the multi-vehicle spatially balanced coverage method according to the present invention. In this embodiment, three drones are deployed to perform a search task based on a known environmental map in order to locate specific objects. The multi-vehicle spatially balanced coverage method 500 included in the present invention involves the following implementation steps.

In step 501, as illustrated in FIG. 5(*a*), a 2D environmental map is pre-established for the environment where the search task performs by using schemes such as actual measurement or laser scanning. In this known map, 12 points of interest (POIs) p are designated to form the point set V. The edges e between each pair of POIs are then calculated to form the edge set E.

In step 502, as illustrated in FIG. 5(*b*), after the starting points for the three drones are specified, a spanning tree is computed for each drone, in order to generate three respective movement paths. In step 503, as illustrated in FIG. 5(*c*), the drones are deployed to move along the planned movement paths to detect objects in the environment. Other potential applications for the present invention include map creation, object detection, patrols, related path planning tasks, etc.

On the other hand, in the third embodiment, the multi-vehicle spatially balanced coverage method included in the present invention is considered as a multi-mobile vehicle path planning system based on a submodular tree. The present invention is aimed at solving the optimal multi-path planning problem when multiple mobile vehicles, such as but not limited to drones, perform search, coverage, or other tasks simultaneously in a known multi-dimensional environment.

It is assumed that the environmental map, over which multiple known nodes, points of interest, or subgoals are distributed, is known. The points of interest are preferably arbitrary pre-specified points, grid points that are evenly distributed or coordinates within the environment. The objective of the path planning is to plan and determine the sequence in which each mobile vehicle visits these points of interest, and generate corresponding movement paths, under the conditions that these paths do not intersect with each other and that the workload and spatial coverage for each vehicle are well balanced, so that the total spatial coverage for performing tasks such as object search, map generation or environment monitoring is as large or maximum as possible.

Preferably, the above objective can be transformed into the following problem: converting a known environmental map into a weighted graph $\mathcal{G}$ (V, E'), where V is the point set containing all the points of interest p, and E is the edge set containing all possible movement paths formed by the connections between the points of interest p. There are k mobile vehicles available. The goal is to find out a total path set $S \subseteq E$ that maximizes the balanced coverage function (S), which acts as the objective function, while the requirements that at least k paths are generated and that the length of each path is as close to equal as possible are satisfied at the same time.

Therefore, the submodular function is the core concept of this system. A function y: $2^V \rightarrow R$ is said to be submodular if $y(A \cup \{e\}) - y(A) \geq y(B \cup \{e\}) - y(B)$ is satisfied for any $A \subseteq B \subseteq V$ and any element $e \notin B$. Intuitively, it means that the function y has the property of "diminishing marginal returns." In this context, it means that as more areas are covered, adding a new point yields a smaller marginal gain as compared to the beginning.

In this embodiment, the balanced coverage function F(S) used as the objective function includes two parts as follows:

$$F(S) = \max f(S) + \lambda B(S) \text{ s.t. } (M_R, M_C)$$

F(S) is the spatial coverage rate function that measures the coverage performance for the total path set S, B(S) is the balance function that ensures that tasks are shared on average among all mobile vehicles and encourages non-intersecting paths, and is a weighting parameter. The preferred form of the balance function B(S) is as follows:

$$\mathcal{B}(S) = -\left[\sum_i p_S(i)\log_2(p_S(i))\right] - N$$

where Ps(i) refers to the relative size of the i-th connected component, and N is the number of connected components.

In order to ensure the feasibility of the solution and the independence among the movement paths, the balanced coverage function F(S) introduces two Matroid constraints:

$M_R$: The path constraint, which is the first limiting condition, ensures that the length of each vehicle's path does not exceed a given limit, such as a workload threshold.

$M_C$: The clustering constraint, which is the second limiting condition, ensures that at least k non-intersecting independent paths are generated to correspond to the k mobile vehicles.

The clustering constraint $M_C$ is preferably defined as:

$$M_C = (E, I_C), \text{ wherein } I_C = \{S \subseteq E: N \geq k\}$$

Therefore, the clustering constraint Mc directly causes each mobile vehicle to have an independent path.

The present invention employs a greedy algorithm including the following steps to solve the balanced coverage function F:

Step 1: Initialization, to set the total path set S to an empty set, S=Ø (empty set).

Step 2: Repeat the following steps until no new edge is qualified to be added:

2.1: For each possible edge e to be added, compute the corresponding marginal gain $F(S \cup \{e\}) - F(S)$.

2.2: Select the edge e* having the largest marginal gain. If adding e* does not violate the Matroid constraints, then $S = S \cup \{e^*\}$.

Furthermore, the present invention realizes that the paths for multiple vehicles do not intersect with each other by implementing the following mechanisms:

a) Ensures that there are at least k independent path clusters for the clustering constraint $M_C$.

b) Renders that the balance function B(S) maintains the independence and balance between each independent path cluster. If paths start to intersect with each other, it causes the value of B(S) to decrease, leading the algorithm to select other options that do not cause the paths to intersect.

c) Connected component analysis: When a new edge is selected, it evaluates how the newly added edge affects and varies the connectivity of the weighted graph. If the addition of a new edge connects two independent paths, the edge is not selected.

d) Greedy selection strategy: By maximizing the balanced coverage function F(S) that includes B(S), the algorithm automatically avoids selecting edges that cause intersections among paths.

Figure 6:
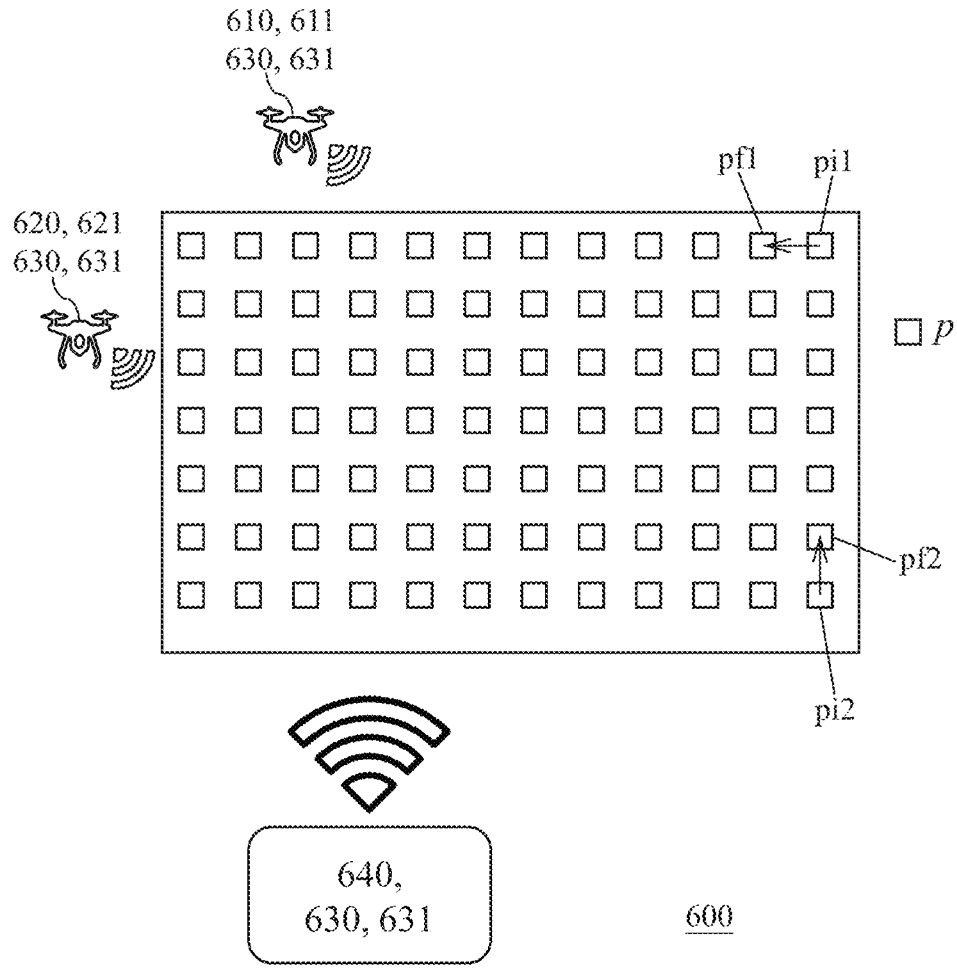
FIG. 6 is a schematic diagram illustrating the system architecture for the multi-vehicle spatially balanced coverage system included in the present invention.

FIG. 6 is a schematic diagram illustrating the system architecture for the multi-vehicle spatially balanced coverage system included in the present invention. The multi-vehicle spatially balanced coverage system 600 includes at least two mobile vehicles, namely the first mobile vehicle 610 and the second mobile vehicle 620. These vehicles are preferably unmanned aerial vehicles (UAVs), ground vehicles, surface vehicles, underwater vehicles, or a combination thereof. In this embodiment, preferably two UAVs are used as an example to describe.

The assumed application scenario in this embodiment is to deploy two UAVs equipped with thermal imaging cameras to search for survivors in a disaster area covering about one square kilometer. The implementation steps include: (1) First dividing the disaster area or multi-dimensional space Z into 84 points of interest p; (2) Applying the multi-vehicle spatially balanced coverage method (MRSM) described in the present disclosure to plan and generate non-intersecting search paths for each UAV; (3) the UAVs follow the planned search paths and use the YOLO algorithm to detect and search for potential survivors in real time. When a potential target is detected, the UAV hovers and sends an alert. In this simulation test, the system in the present invention improves efficiency of search by 30% and reduces overlapping coverage areas by 50% as compared to the traditional grid search methods.

In this embodiment, the first mobile vehicle 610 and the second mobile vehicle 620 perform search tasks in the multi-dimensional space Z containing multiple points of interest p. The multi-dimensional space Z is preferably uniformly divided into 84(7×12) points of interest p.

Both the first mobile vehicle 610 and the second mobile vehicle 620 are equipped with sensing units, which include but are not limited to imaging sensors, piezoelectric chemical sensors, surface acoustic wave sensors, optical chemical sensors, electrochemical sensors, semiconductor chemical sensors, surface plasmon resonance chemical sensors, biosensors, thermal chemical sensors, magnetic chemical sensors, field chemical sensors, toxic gas field chemical sensors, chemical sensors, MEMS sensors, nanocrystal chemical sensors, electromagnetic sensors, mechanical wave sensors, thermal sensors, force sensors, cameras, and combinations thereof. In this embodiment, high-resolution cameras are selected and used as the sensing units.

The multi-vehicle spatially balanced coverage system 600 further includes at least one computing unit 630. The computing unit 630 serves as a computing core for the system, is responsible for receiving and processing environmental information from the mobile vehicles and executes the multi-vehicle spatially balanced coverage method according to the present invention to plan flight paths for the first mobile vehicle 610 and the second mobile vehicle 620.

The computing unit 630 is preferably installed on one of the first mobile vehicle 610, the second mobile vehicle 620, a remote server 640, and other remote computing devices. For example, in certain embodiments, two computing units 630 are preferably configured on the first mobile vehicle 610 and the second mobile vehicle 620, respectively. These two computing units 630 are configured to share computing tasks and information with each other via a distributed computing architecture or a parallel computing architecture, to perform the computing tasks required by the multi-vehicle spatially balanced coverage method according to the present invention. In some embodiments, three computing units 630 are preferably configured on the first mobile vehicle 610, the second mobile vehicle 620, and the remote server 640, respectively.

In certain embodiments, only a single computing unit 630 is configured on a remote server 630 to perform the computing tasks required by the multi-vehicle spatially balanced coverage method according to the present invention. Alternatively, a single computing unit 630 is configured on either the first mobile vehicle 610 or the second mobile vehicle 620 to perform the required computing tasks.

Wherever the computing unit 630 is installed, it is connected with both the first mobile vehicle 610 and the second mobile vehicle 620 via a telecommunications network or the Internet. When multiple computing units 630 are used, they communicate with each other, and with the first mobile vehicle 610 and the second mobile vehicle 620 via a telecommunications network or the Internet. The computing unit 630 further includes a real-time adjustment module 631 configured to dynamically adjust the next forward point of interest.

The operational processes for the computing unit 630 include the steps as follows. Given multiple points of interest in a multi-dimensional space, these points of interest include the first initial point of interest pi1, the second initial point of interest pi2, the first forward point of interest pf1, and the second forward point of interest pf2.

Then, the first mobile vehicle 610 and the second mobile vehicle 620 are deployed in the multi-dimensional space, and the first initial point of interest pi1 and the second initial point of interest pi2 are designated as the initial positions for the first mobile vehicle 610 and the second mobile vehicle 620, respectively.

The first mobile vehicle 610 and the second mobile vehicle 620 then begin to perform their flight missions. The first mobile vehicle 610 is configured to use the first sensing unit 611 to sense the surrounding environment and obtain the first environmental information. The second mobile vehicle 620 is configured to use the second sensing unit 621 to sense the surrounding environment and obtain the second environmental information. The first mobile vehicle 610 and the second mobile vehicle 620 are then configured to transmit the first environmental information and the second environmental information back to the computing unit 630.

After receiving the first environmental information and the second environmental information, the computing unit 630 is configured to input this information into the previously described balanced coverage function, i.e., the objective function, to calculate the first forward point of interest pf1 and the second forward point of interest pf2. The computing unit 630 is then configured to command the first mobile vehicle to move from the first initial point of interest pi1 to the first forward point of interest pf1, and the second mobile vehicle to move from the second initial point of interest pi2 to the second forward point of interest pf2 in real time.

Preferably, the computing unit 630 is further configured to establish the spatial coverage rate function based on the multi-dimensional space information and the balanced load function based on the balanced load conditions, and a balanced coverage function that combines the spatial coverage rate function and the balanced load function, with the balanced coverage function being constrained by the first and second constraints.

Preferably, the computing unit 630 is further configured to input the first initial point of interest pi1 and the second initial point of interest pi2 into the balanced coverage function and compute its maximum value; obtain the total path set corresponding to the maximum value, which includes multiple connected components such as the first connected component and the second connected component; compute whether the number of connected components is greater than or equal to the vehicle quantity threshold; generate a first spanning tree and a second spanning tree based on the first connected component and the second connected component, respectively, if the number of connected components is greater than or equal to the vehicle quantity threshold; recalculate the balanced coverage function to obtain a new total path set if the number of connected components is less than the vehicle quantity threshold; generate the first and second mobile paths, respectively, based on the first spanning tree and the second spanning tree; and compute whether the first and second mobile paths are less than or equal to the workload threshold.

The computing unit 630 is further configured to determine if the first movement path and the second movement path are less than or equal to the workload threshold, to plan, schedule or arrange the first mobile vehicle and the second mobile vehicle to move along the first and second movement paths, respectively, in the multi-dimensional space if the first movement path and the second movement path are less than or equal to the workload threshold, to recompute the balanced coverage function to obtain a new total path set if the first movement path and the second movement path are greater than the workload threshold, and to ensure that the first movement path includes the first initial point of interest pi1 and the first forward point of interest pf1, the second movement path includes the second initial point of interest pi2 and the second forward point of interest pf2, and the first and second movement paths do not intersect each other.

The real-time adjustment module 631 within the computing unit 630 is configured to dynamically adjust the respective positions for the first forward point of interest pf1 and the second forward point of interest pf2 based on variations in the first environmental information and the second environmental information.

The present invention provides a highly efficient, flexible and safe solution for balancing spatial coverage among multiple vehicles, capable of realizing optimization in spatial coverage and task execution in challenging environments. The system and method according to the present invention can adapt to various environmental conditions, and ensure coordinated operations among multiple vehicles while maintaining approximately equal workloads and avoiding path conflicts.

FIG. 7 is a flow chart illustrating the implementation steps for the third embodiment of the multi-vehicle spatially balanced coverage method according to the present invention. In summary, the multi-vehicle spatially balanced coverage method 700 according to the present invention preferably includes the steps as follows: giving a plurality of points of interest in a multi-dimensional space, wherein a plurality of points of interest includes a first initial point of interest, a second initial point of interest, a first forward point of interest, and a second forward point of interest (step 701); establishing a spatial coverage rate function including a spatial coverage rate of each of the plurality of points of interest based on a multi-dimensional space information about the multi-dimensional space (step 702); establishing a balanced load function based on a balanced load condition (step 703); establishing a balanced coverage function including the spatial coverage rate function and the balanced load function (step 704); subjecting the balanced coverage function to a first constraint condition and a second constraint condition (step 705); sensing a first environmental information through a first sensor unit configured on a first mobile vehicle (step 706); sensing a second environmental information through a second sensor unit configured on a second mobile vehicle (step 707); receiving the first environmental information and the second environmental information through a computing unit and inputting them into the balanced coverage function to compute the first forward point of interest and the second forward point of interest accordingly (step 708); and driving the first mobile vehicle to move from the first initial point of interest to the first forward point of interest and the second mobile vehicle to move from the second initial point of interest to the second forward point of interest (step 709).

The Present Invention Further Includes the Following Features:

a) Environment modeling: Using simultaneous localization and mapping (SLAM) technology to create a 3D model of the environment, which is then dimensionally reduced into a 2D graph structure to reduce the overall computational load.

b) Path planning: Executing the MRSM algorithm according to the present invention on the computing unit, which serves as the central control station, to generate the path for each UAV.

c) Path execution: Converting the planned paths into a series of waypoints that are sent to the navigation system configured on each UAV.

d) Real-time adaptation: This is a feedback mechanism that allows the UAV to request a path replanning if it encounters unexpected obstacles.

e) Data fusion: Integrating all the information collected by the UAVs at the central control station to generate a unified view of the surrounding environment.

Compared to traditional multi-robot path planning methods, the present invention owns the following advantages:

a) Global optimization: The present invention significantly improves global performance for the simultaneous localization and mapping by introducing submodular function optimization.

b) Theoretical guarantee: The present algorithm guarantees the performance of at least ⅓ of the optimal solution, which is valuable in complex multi-robot systems.

c) Naturally non-intersecting paths: Unlike methods used by the prior art that require additional collision avoidance algorithms, the present system naturally generates non-intersecting paths through its mathematical model.

d) Scalability: The present method can be easily scaled to accommodate more robots and more complex environments.

The system according to the present invention can be applied to various scenarios, including but not limited to: multi-UAV search and rescue missions; warehouse mobile vehicle path planning; multi-mobile vehicle environmental monitoring; autonomous vehicle fleet path planning.

In summary, the present invention is a multi-robot path planning system based on submodular trees. By ingeniously combining submodular function optimization, Matroid theory, and graph theory, it not only provides a theoretically guaranteed solution but also demonstrates excellent multi-path planning capabilities in practical applications.

In particular, the present invention is capable of generating non-intersecting multi-robot mobile paths, which significantly improves overall efficiency and safety. In addition, the present invention offers advantages in global planning and scalability, which makes it a valuable tool for multi-robot collaboration applications.

There are Further Embodiments Provided as Follows.

Embodiment 1: A multi-vehicle spatially balanced coverage system includes: a first mobile vehicle including a first sensor unit configured to sense a first environmental information; a second mobile vehicle including a second sensor unit configured to sense a second environmental information; and a computing unit configured to receive the first environmental information and the second environmental information, input them into a balanced load function, and accordingly compute a first forward point of interest and a second forward point of interest, to command in real-time the first mobile vehicle to move from a first initial point of interest to the first forward point of interest and the second mobile vehicle to move from a second initial point of interest to the second forward point of interest.

Embodiment 2: The multi-vehicle spatially balanced coverage system according to Embodiment 1, the first sensor unit and the second sensor unit are selected from one of an image sensor, a piezoelectric crystal chemical sensor, a surface acoustic wave sensor, an optical chemical sensor, an electrochemical sensor, a semiconductor chemical sensor, a surface plasmon resonance chemical sensor, a biosensor, a thermochemical sensor, a magnetic chemical sensor, a field chemical sensor, a toxic gas field chemical sensor, a chemical sensor, a microelectromechanical sensor, a nanocrystal chemical sensor, an electromagnetic wave sensor, a mechanical wave sensor, a thermal sensor, a force sensor, a camera, and combinations thereof.

Embodiment 3: The multi-vehicle spatially balanced coverage system according to Embodiment 1, the computing unit further includes a real-time adjustment module configured to dynamically adjust locations of the first forward point of interest and the second forward point of interest based on changes in the first environmental information and the second environmental information.

Embodiment 4: The multi-vehicle spatially balanced coverage system according to Embodiment 1, the computing unit is included in on one of the first mobile vehicle, the second mobile vehicle, a remote server, and a remote computing device.

Embodiment 5: A multi-vehicle spatially balanced coverage method includes: sensing a first environmental information through a first sensor unit configured on a first mobile vehicle; sensing a second environmental information through a second sensor unit configured on a second mobile vehicle; receiving the first environmental information and the second environmental information through a computing unit and inputting them into a balanced coverage function to compute a first forward point of interest and a second forward point of interest accordingly; and driving the first mobile vehicle to move from a first initial point of interest to the first forward point of interest and the second mobile vehicle to move from a second initial point of interest to the second forward point of interest.

Embodiment 6: The multi-vehicle spatially balanced coverage method according to Embodiment 5 further includes: giving a plurality of points of interest in a multi-dimensional space, wherein the plurality of points of interest includes the first initial point of interest, the second initial point of interest, the first forward point of interest, and the second forward point of interest; deploying the first mobile vehicle and the second mobile vehicle in the multi-dimensional space; and planning the first initial point of interest and the second initial point of interest as starting points for the first mobile vehicle and the second mobile vehicle respectively.

Embodiment 7: The multi-vehicle spatially balanced coverage method according to Embodiment 6 further includes: establishing a spatial coverage rate function including a spatial coverage rate of each of the plurality of points of interest based on a multi-dimensional space information about the multi-dimensional space; establishing a balanced load function based on a balanced load condition; establishing the balanced coverage function including the spatial coverage rate function and the balanced load function; and subjecting the balanced coverage function to a first constraint condition and a second constraint condition.

Embodiment 8: The multi-vehicle spatially balanced coverage method according to Embodiment 7 further includes: inputting the first initial point of interest and the second initial point of interest into the balanced coverage function and computing a maximum value of the balanced coverage function accordingly; obtaining a total path set corresponding to the maximum value, wherein the total path set includes a plurality of connected components, and the plurality of connected components include a first connected component and a second connected component; and computing whether a number of the plurality of connected components is greater than or equal to a vehicle number threshold.

Embodiment 9: The multi-vehicle spatially balanced coverage method according to Embodiment 8 further includes: when the number of the plurality of connected components is greater than or equal to the vehicle number threshold, generating a first spanning tree and a second spanning tree based on the first connected component and the second connected component respectively; when the number of the plurality of connected components is less than the vehicle number threshold, recomputing the balanced coverage function to obtain the total path set; generating a first movement path and a second movement path based on the first spanning tree and the second spanning tree respectively; and computing whether the first movement path and the second movement path are less than or equal to a workload threshold.

Embodiment 10: The multi-vehicle spatially balanced coverage method according to Embodiment 9 further includes: when the first movement path and the second movement path are less than or equal to the workload threshold, planning for the first mobile vehicle and the second mobile vehicle to move in the multi-dimensional space according to the first movement path and the second movement path respectively; and when the first movement path and the second movement path are greater than the workload threshold, recomputing the balanced coverage function to obtain the total path set, wherein the first movement path includes the first initial point of interest and the first forward point of interest and the second movement path includes the second initial point of interest and the second forward point of interest, wherein the first movement path and the second movement path do not intersect with each other.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A multi-vehicle spatially balanced coverage system, comprising:

a first mobile vehicle comprising a first sensor unit configured to sense a first environmental information;

a second mobile vehicle comprising a second sensor unit configured to sense a second environmental information; and a computing unit configured to:

receive the first environmental information and the second environmental information, input them into a balanced coverage function, and accordingly compute a first forward point of interest and a second forward point of interest, to command in real-time the first mobile vehicle to move from a first initial point of interest to the first forward point of interest and the second mobile vehicle to move from a second initial point of interest to the second forward point of interest;

input the first initial point of interest and the second initial point of interest into the balanced coverage function and computing a maximum value of the balanced coverage function accordingly;

obtain a total path set corresponding to the maximum value, wherein the total path set comprises a plurality of connected components, and the plurality of connected components comprise a first connected component and a second connected component;

compute whether a number of the plurality of connected components is greater than or equal to a vehicle number threshold; and generate a first movement path comprising the first initial point of interest and the first forward point of interest, and a second movement path comprising the second initial point of interest and the second forward point of interest, according to the first connected component and the second connected component, respectively, when the number of the plurality of connected components is greater than or equal to the vehicle number threshold.

2. The multi-vehicle spatially balanced coverage system according to claim 1, wherein the first sensor unit and the second sensor unit are selected from one of an image sensor, a piezoelectric crystal chemical sensor, a surface acoustic wave sensor, an optical chemical sensor, an electrochemical sensor, a semiconductor chemical sensor, a surface plasmon resonance chemical sensor, a biosensor, a thermochemical sensor, a magnetic chemical sensor, a field chemical sensor, a toxic gas field chemical sensor, a chemical sensor, a microelectromechanical sensor, a nanocrystal chemical sensor, an electromagnetic wave sensor, a mechanical wave sensor, a thermal sensor, a force sensor, a camera, and combinations thereof.

3. The multi-vehicle spatially balanced coverage system according to claim 1, wherein the computing unit further comprises a real-time adjustment module configured to dynamically adjust locations of the first forward point of interest and the second forward point of interest based on changes in the first environmental information and the second environmental information.

4. The multi-vehicle spatially balanced coverage system according to claim 1, wherein the computing unit is comprised in on one of the first mobile vehicle, the second mobile vehicle, a remote server, and a remote computing device.

5. A multi-vehicle spatially balanced coverage method, comprising:

sensing a first environmental information through a first sensor unit configured on a first mobile vehicle;

sensing a second environmental information through a second sensor unit configured on a second mobile vehicle;

receiving the first environmental information and the second environmental information through a computing unit and inputting them into a balanced coverage function to compute a first forward point of interest and a second forward point of interest accordingly; and driving the first mobile vehicle to move from a first initial point of interest to the first forward point of interest and the second mobile vehicle to move from a second initial point of interest to the second forward point of interest, wherein the multi-vehicle spatially balanced coverage method further comprises:

inputting the first initial point of interest and the second initial point of interest into the balanced coverage function and computing a maximum value of the balanced coverage function accordingly;

obtaining a total path set corresponding to the maximum value, wherein the total path set comprises a plurality of connected components, and the plurality of connected components comprise a first connected component and a second connected component;

computing whether a number of the plurality of connected components is greater than or equal to a vehicle number threshold; and generating a first movement path comprising the first initial point of interest and the first forward point of interest, and a second movement path comprising the second initial point of interest and the second forward point of interest, according to the first connected component and the second connected component, respectively, when the number of the plurality of connected components is greater than or equal to the vehicle number threshold.

6. The multi-vehicle spatially balanced coverage method according to claim 5, further comprising:

giving a plurality of points of interest in a multi-dimensional space, wherein the plurality of points of interest comprises the first initial point of interest, the second initial point of interest, the first forward point of interest, and the second forward point of interest;

deploying the first mobile vehicle and the second mobile vehicle in the multi-dimensional space; and planning the first initial point of interest and the second initial point of interest as starting points for the first mobile vehicle and the second mobile vehicle respectively.

7. The multi-vehicle spatially balanced coverage method according to claim 6, further comprising:

establishing a spatial coverage rate function comprising a spatial coverage rate of each of the plurality of points of interest based on a multi-dimensional space information about the multi-dimensional space;

establishing a balanced load function based on a balanced load condition;

establishing the balanced coverage function comprising the spatial coverage rate function and the balanced load function; and subjecting the balanced coverage function to a first constraint condition and a second constraint condition.

8. The multi-vehicle spatially balanced coverage method according to claim 7, further comprising:

when the number of the plurality of connected components is greater than or equal to the vehicle number threshold, generating a first spanning tree and a second spanning tree based on the first connected component and the second connected component respectively;

when the number of the plurality of connected components is less than the vehicle number threshold, recomputing the balanced coverage function to obtain the total path set;

generating the first movement path and the second movement path based on the first spanning tree and the second spanning tree respectively; and computing whether the first movement path and the second movement path are less than or equal to a workload threshold.

9. The multi-vehicle spatially balanced coverage method according to claim 8, further comprising:

when the first movement path and the second movement path are less than or equal to the workload threshold, planning for the first mobile vehicle and the second mobile vehicle to move in the multi-dimensional space according to the first movement path and the second movement path respectively; and when the first movement path and the second movement path are greater than the workload threshold, recomputing the balanced coverage function to obtain the total path set, wherein the first movement path comprises the first initial point of interest and the first forward point of interest and the second movement path comprises the second initial point of interest and the second forward point of interest, wherein the first movement path and the second movement path do not intersect with each other.

* * * * *